(12) United States Patent
Kim et al.

(10) Patent No.: US 10,082,691 B2
(45) Date of Patent: Sep. 25, 2018

(54) DISPLAY DEVICE

(71) Applicant: SAMSUNG DISPLAY CO., LTD., Yongin-si, Gyeonggi-do (KR)

(72) Inventors: Min Woo Kim, Suwon-si (KR); Dong In Kim, Suwon-si (KR); Hyun Seok Hong, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 181 days.

(21) Appl. No.: 14/658,055

(22) Filed: Mar. 13, 2015

(65) Prior Publication Data

US 2016/0044815 A1     Feb. 11, 2016

(30) Foreign Application Priority Data

Aug. 11, 2014   (KR) .................. 10-2014-0103161

(51) Int. Cl.
*H05K 7/02* (2006.01)
*G02F 1/1333* (2006.01)

(52) U.S. Cl.
CPC .... *G02F 1/133308* (2013.01); *G02F 2202/22* (2013.01)

(58) Field of Classification Search
CPC ................... G02F 1/133308; G02F 2202/22
See application file for complete search history.

(56) References Cited

U.S. PATENT DOCUMENTS

| | | | |
|---|---|---|---|
| 6,219,127 B1 * | 4/2001 | Hirakata | G02F 1/1341 349/153 |
| 7,245,076 B2 * | 7/2007 | Isohata | H05K 7/20963 313/493 |
| 7,548,287 B2 * | 6/2009 | Oh | G02B 6/0091 349/150 |
| 7,778,676 B2 | 8/2010 | Keski-Opas | |
| 7,839,464 B2 * | 11/2010 | Lim | H05K 7/20963 349/58 |
| 8,259,250 B2 * | 9/2012 | Sato | G02F 1/13452 349/58 |
| 2005/0017350 A1 * | 1/2005 | Corti | H01L 23/3672 257/706 |
| 2006/0038635 A1 | 2/2006 | Richiuso et al. | |
| 2006/0055841 A1 | 3/2006 | Keski-Opas | |
| 2007/0057327 A1 | 3/2007 | Chen | |
| 2009/0122217 A1 * | 5/2009 | Chen | G02F 1/133308 349/58 |
| 2009/0180225 A1 | 7/2009 | Pan et al. | |

(Continued)

FOREIGN PATENT DOCUMENTS

KR   10-2005-0014944 A   2/2005
KR   10-2005-0116271 A   12/2005
(Continued)

*Primary Examiner* — Tuan T Dinh
*Assistant Examiner* — Rockshana D Chowdhury
(74) *Attorney, Agent, or Firm* — Lewis Roca Rothgerber Christie LLP

(57) ABSTRACT

A display device may include a display panel, a light source configured to provide light to the display panel, a bottom chassis in which the light source is located, a top chassis coupled to the bottom chassis and covering an edge of the display panel, and a conductive tape attached to the bottom chassis and the top chassis. The conductive tape may have an uneven pattern.

13 Claims, 8 Drawing Sheets

(56) References Cited

U.S. PATENT DOCUMENTS

| | | | | |
|---|---|---|---|---|
| 2009/0310055 A1* | 12/2009 | Kim | ................... | G02F 1/133528 |
| | | | | 349/58 |
| 2012/0044650 A1* | 2/2012 | Kim | ................... | G02F 1/133308 |
| | | | | 361/718 |
| 2012/0099045 A1* | 4/2012 | Hamada | ............... | G02B 6/0085 |
| | | | | 349/58 |
| 2012/0106201 A1* | 5/2012 | Choi | ................... | H04M 1/0266 |
| | | | | 362/632 |
| 2013/0094160 A1* | 4/2013 | Narumi | ............. | G02F 1/133308 |
| | | | | 361/752 |
| 2013/0176513 A1* | 7/2013 | Sato | ................... | G02F 1/133308 |
| | | | | 349/33 |
| 2013/0329460 A1* | 12/2013 | Mathew | ................... | H05K 5/02 |
| | | | | 362/612 |
| 2014/0016287 A1* | 1/2014 | Kawauchi | .......... | H01R 13/6584 |
| | | | | 361/757 |

FOREIGN PATENT DOCUMENTS

| | | | |
|---|---|---|---|
| KR | 10-2007-0025526 A | | 3/2007 |
| KR | 10-2009-0050 | * | 12/2010 |

* cited by examiner

DISPLAY DEVICE

CROSS-REFERENCE TO RELATED APPLICATION

This application claims priority to and the benefit of Korean Patent Application No. 10-2014-0103161, filed on Aug. 11, 2014, in the Korean Intellectual Property Office, the entire content of which is incorporated herein by reference.

BACKGROUND

1. Field

Aspects of embodiments of the inventive concept relate to a display device including a conductive tape configured to remove, prevent, or reduce static electricity.

2. Description of Related Art

A liquid crystal display (LCD) is a type (or kind) of flat panel display (FPD), which is one of the most widely used displays these days, and is configured such that a liquid crystal layer is between two substrates having electrodes such that liquid crystal molecules of the liquid crystal layer are rearranged upon applying voltage to the electrodes, thereby adjusting the amount of transmitted light.

A display device, such as a liquid crystal display (LCD), may include a display panel that displays an image and may also include a backlight assembly that supplies light to the display panel. The backlight assembly may be classified into three types (or kinds): a direct type (or kind), an edge type (or kind), and a corner type (or kind), based on the location of a light source.

A display device, such as a liquid crystal display (LCD), may include a top chassis on a side so as to protect a driving chip-mounted film and a printed circuit board (PCB). However, static electricity may be caused by external factors and may penetrate through the top chassis, which may be made of a metal material, or may be caused by compulsively applied static electricity, such as from a withstanding voltage test, which may result in damage to the driving chip-mounted film and the printed circuit board (PCB). A driving chip included in the driving chip-mounted film may be particularly damaged by static electricity flowing through the top chassis.

It is to be understood that this background section is intended to provide useful background information for understanding the technology disclosed herein. As such, the background section may include ideas, concepts or recognitions that were not part of what was known or appreciated by those skilled in the pertinent art prior to the corresponding effective filing dates of the present application.

SUMMARY

Aspects of embodiments of the inventive concept are directed toward a display device in which static electricity is effectively removed or reduced, thereby protecting internal modules.

According to an embodiment of the inventive concept, a display device includes a display panel, a light source configured to provide light to the display panel, a bottom chassis in which the light source is located, a top chassis coupled to the bottom chassis and covering an edge of the display panel, and a conductive tape attached to the bottom chassis and the top chassis. The conductive tape may have an uneven pattern.

The top chassis may include a sidewall coupled to the bottom chassis, and a protrusion that bendably extends from the sidewall, the protrusion being on an edge portion of the display panel.

The protrusion may have holes along the display panel.

The conductive tape may have peaks that face the holes.

The conductive tape may have peaks, and respective ones of the peaks may be between adjacent ones of the holes.

The conductive tape may be on one surface of the protrusion.

The conductive tape may be on one surface of the protrusion and on one surface of the sidewall.

The top chassis may further include a bottom part that bendably extends from the sidewall and that faces the protrusion.

The conductive tape may be on one surface of the protrusion, on one surface of the sidewall, and on one surface of the bottom part.

The uneven pattern may have a triangle shape.

The display device may further include a driving chip-mounted film coupled to the display panel and configured to provide the display panel with driving signals, and a printed circuit board coupled to the driving chip-mounted film.

The printed circuit board may be on a side surface of the bottom chassis and may face the sidewall of the top chassis.

The conductive tape may be on the driving chip-mounted film.

The conductive tape may be further on the printed circuit board.

According to aspects of embodiments of the inventive concept, a display device is capable of reducing or preventing damage to a driving chip, which may otherwise result from externally introduced static electricity, reducing or removing static electricity flowing towards a display panel, reducing or preventing signal distortion of the driving chip, which may otherwise be caused by the inflow of static electricity, and improving display quality and reliability of the display device due to the reduction of static electricity.

The foregoing summary is illustrative only and is not intended to limit the claims of the inventive concept in any way. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Figure 1:
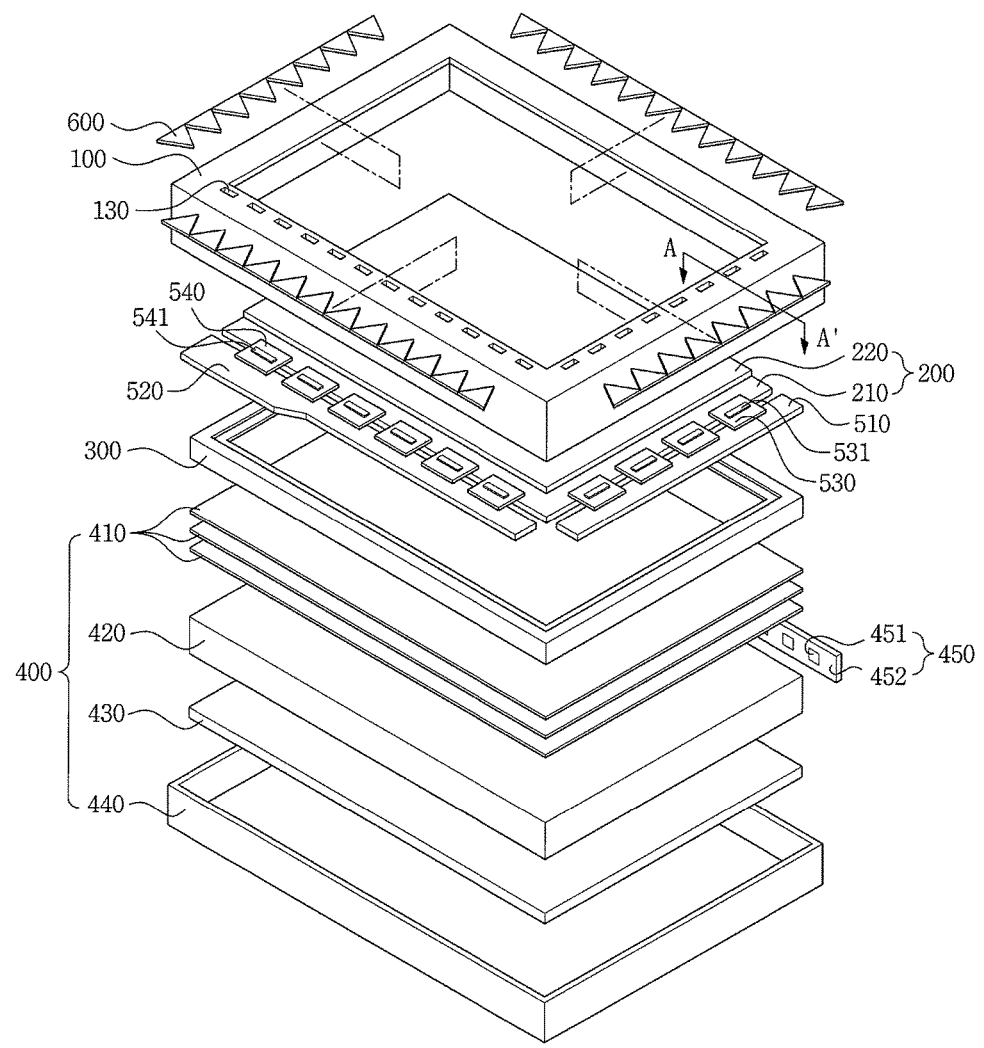
FIG. 1 is an exploded perspective view of a display device according to a first embodiment of the inventive concept.

Advantages and features of structures in accordance with the present disclosure and methods for achieving them will be made clear by the embodiments described below with reference to the accompanying drawings. The subject matter of the present disclosure may, however, be embodied in many different forms and should not be construed as being limited to the specific embodiments set forth herein. Rather, these embodiments are provided so that this disclosure will be thorough and complete, and will fully convey the scope of the present disclosure to those skilled in the pertinent art. Like reference numerals refer to like elements throughout the specification.

Spatially relative terms, such as "below", "beneath", "lower", "above", "upper", and the like, may be used herein for ease of description to describe the relation between one element or component and another element or component as illustrated in the drawings. It will be understood, however, that the spatially relative terms used herein are intended to encompass different orientations of the device in use or operation, in addition to the orientations depicted in the drawings. For example, in the case where a device shown in the drawing is turned over, the device or feature positioned "below" or "beneath" another device or feature may be placed "above" the other device or feature. Accordingly, the illustrative term "below" may refer to a lower or upper position, depending upon the point of view. The device may also be oriented in the other direction, and thus the spatially relative terms used herein may be interpreted differently depending on the orientation.

The terminology used herein is for the purpose of describing particular embodiments only and should not be construed as limiting the invention. As used herein, the singular forms "a," "an" and "the" are intended to include the plural forms as well, unless the context clearly indicates otherwise. It will be further understood that the terms "comprises" and/or "comprising," when used in this specification, specify the presence of the referenced component, act, operation and/or element, but do not exclude the presence or addition of one or more other components, acts, operations and/or elements.

Unless otherwise defined, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, in the context of the present application, when a first element is referred to as being "on" a second element, it can be directly on the second element or be indirectly on the second element with one or more intervening elements interposed therebetween. Further, in the context of the present application, when a first element is referred to as being "coupled or connected to" a second element, it can be directly coupled or connected to the second element or be indirectly coupled or connected to the second element with one or more intervening elements interposed therebetween.

Hereinafter, a display device according to a first embodiment of the inventive concept will be described with reference to FIGS. 1 to 3.

FIG. 1 is an exploded perspective view of the display device according to the first embodiment of the inventive concept. FIG. 2 is a cross-sectional view taken along line A-A' of FIG. 1. FIG. 3 is a cross-sectional view taken along line A-A' of FIG. 1 showing a discharge path of external static electricity.

Figure 2:
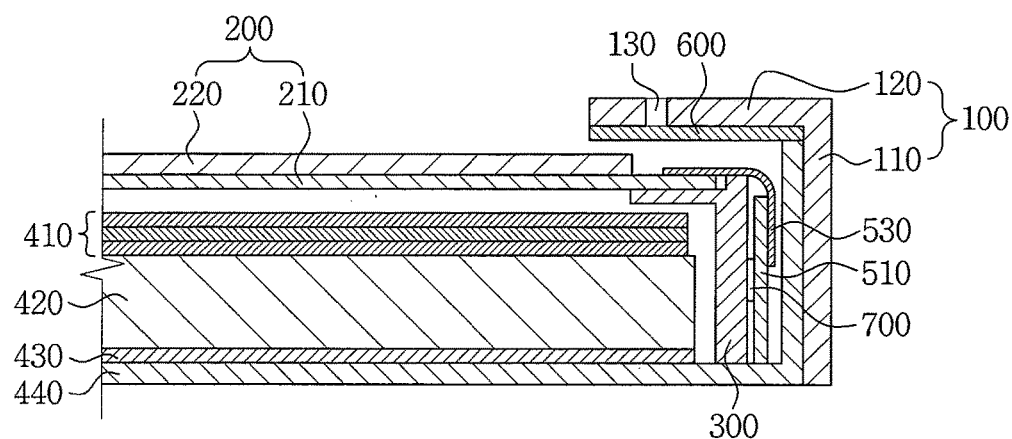
FIG. 2 is a cross-sectional view taken along line A-A' of FIG. 1.
Figure 3:
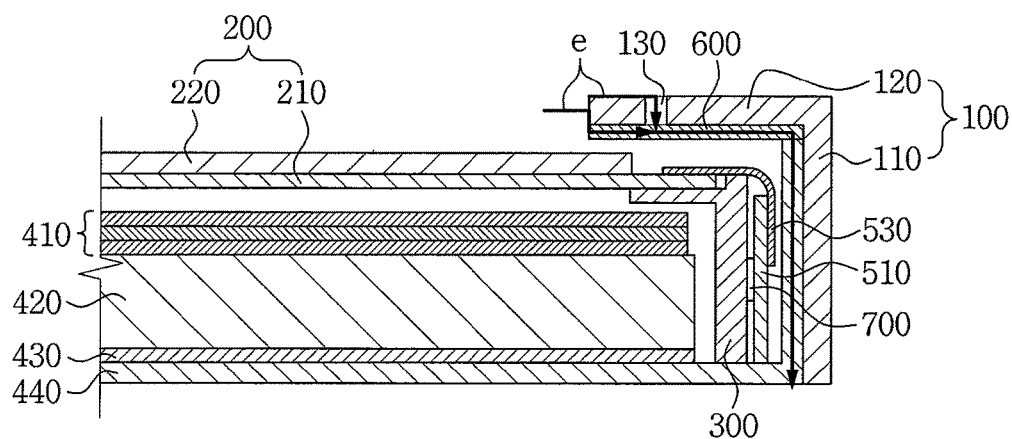
FIG. 3 is a cross-sectional view taken along line A-A' of FIG. 1 showing a discharge path of external static electricity.

Referring to FIGS. 1 to 3, the display device may include a display panel 200 configured to display an image, a backlight assembly 400 configured to supply light to the display panel 200, a top chassis 100 configured to cover the display panel 200, and a mold frame 300 to which or on which the display panel 200 is mounted.

The top chassis 100 may be coupled to a bottom case 440 so as to cover an edge of the display panel 200, which may be mounted on or to the mold frame 300. The edge of the display panel 200, which is covered by the top chassis 100, may be a non-display area. The top chassis 100 may have an open window in its central portion, and the display panel 200 may be exposed through the open window. For example, the open window may be an opening in the top chassis 100, or the open window may be a transparent substrate (e.g., glass, and/or a transparent polymer film).

The top chassis 100 may protect driving chip-mounted films 530 and 540 and printed circuit boards (PCBs) 510 and 520. The top chassis 100 also may prevent the driving chip-mounted films 530 and 540 and the PCBs 510 and 520 from being separated from the bottom chassis 440 (or may reduce a likelihood or amount of such separation). In an embodiment, the driving chip-mounted films 530 and 540 and the PCBs 510 and 520 may be disposed on an exterior side surface of the bottom chassis 440, and then the top chassis 100 may surround the driving chip-mounted films 530 and 540 and the PCBs 510 and 520. In another embodiment, for example, as shown in FIG. 2, the driving chip-mounted films 530 and 540 and the PCBs 510 and 520 may be on an interior side surface of the bottom chassis 440.

The top chassis 100 may be coupled to the bottom chassis 440 using hooks and/or screws, but the present disclosure is not limited thereto. For example, the top chassis 100 and the bottom chassis 440 may be coupled to each other in a variety of suitable ways or forms.

The display panel 200 may display an image. The display panel 200 may be a light receiving display panel and may include a liquid crystal display panel, an electrowetting display panel, an electrophoretic display panel, or a micro-electromechanical systems (MEMS)-based display panel, but the present disclosure is not limited thereto. To facilitate the description of this embodiment, the display panel 200 will be described as a liquid crystal display (LCD) panel.

The display panel 200 may be shaped like a quadrangular plate having two pairs of parallel or substantially parallel sides (e.g., the sides of one of the pairs may be parallel or substantially parallel with one another without being parallel to the sides of the other pair), but the present disclosure is not limited thereto. In one embodiment, the display panel 200 may have a rectangular shape that has a pair of long sides and a pair of short sides (e.g., the rectangular shape may have two pairs of sides, each of the sides of the first pair being longer than each of the sides of the second pair). The display panel 200 may include a first substrate 210, a second substrate 220 facing the first substrate 210, and a liquid crystal layer between the first and second substrates 210 and 220. The display panel 200 may include a display area that displays an image and a non-display area that surrounds the display area and that does not display an image when viewed from the top. The non-display area may be covered by the top chassis 100.

The first substrate 210 may include a plurality of pixel electrodes and a plurality of thin film transistors (TFTs) that are electrically coupled or connected to correspond to one-to-one relationships with the pixel electrodes. A data line may be coupled or connected to a source electrode of the TFT, a gate line may be coupled or connected to a gate electrode of the TFT, and the pixel electrode may be coupled or connected to a drain electrode of the TFT. Each TFT may switch driving signals supplied to its corresponding pixel electrode. The second substrate 220 may include a common electrode capable of generating an electric field for controlling arrangements of liquid crystal molecules, in conjunction with the pixel electrodes. The display panel 200 may allow the liquid crystal layer to drive so as to display an image in a forward direction.

The display panel 200 may include driving chips 531 and 541 configured to supply driving signals, the driving chip-mounted films 530 and 540 to which or in which the driving chips 531 and 541 are mounted, and the PCBs 510 and 520 electrically coupled or connected to the display panel 200 through the driving chip-mounted films 530 and 540. The driving chip-mounted films 530 and 540 may include a tape carrier package (TCP).

The driving chip-mounted films 530 and 540 and the PCBs 510 and 520 may be bent at one end portion of the display panel 200 and may be disposed on a side surface of the mold frame 300. For example, the driving chip-mounted films 530 and 540 may be bent such that the PCBs 510 and 520 may be on the side surface of the mold frame 300.

The driving chips 531 and 541 may produce driving signals to drive the display panel 200 in response to external signals. The external signals may be supplied from the PCBs 510 and 520 and may include image signals, control signals, and/or driving voltages.

In one embodiment, the driving chip-mounted films may include a gate driving chip-mounted film 530 and the PCBs may include a gate PCB 510, which may be coupled or connected to the gate driving chip-mounted film 530. The driving chips may include a gate driving chip, and the gate PCB 510 may apply image signals to the gate driving chip 531. The driving chip-mounted films may include a data driving chip-mounted film 540, and the PCBs may include a data PCB 520, which may be coupled or connected to the data driving chip-mounted film 540. The driving chips may include a data driving chip 541, and the data PCB 520 may apply image signals to the data driving chip 541.

The gate driving chip 531 may receive the image signals and may apply gate driving signals to the gate line. The data driving chip 541 may receive the image signals and may apply data driving signals to the data line.

An insulating member 700 may reduce or prevent defects and other problems caused by or resulting from static electricity of the mold frame 300 and the PCBs 510 and 520.

A polarizer may be disposed on the display panel 200 and may include a first polarizer and a second polarizer. The first and second polarizers may be respectively disposed opposite facing surfaces of the first and second substrates 210 and 220 (e.g., the first and second substrates 210 and 220 may be between the first polarizer and the second polarizer). For example, the first polarizer may be attached to an exterior side of the first substrate 210, and the second polarizer may be attached to an exterior side of the second substrate 220. A transmission axis of the first polarizer may be substantially orthogonal to a transmission axis of the second polarizer.

The mold frame 300 may be coupled to the bottom chassis 440 and may accommodate the display panel 200. The mold frame 300 may include or be made of a flexible material such as plastic or other suitable polymers in order to reduce or prevent damage to the display panel 200.

The mold frame 300 may be disposed along edges of the display panel 200 and may support the display panel 200 from under the display panel 200. The mold frame 300 may also support or fix other components (e.g., an optical sheet 410 and/or a light guide plate 420) as well as the display panel 200. The mold frame 300 may be disposed in a place corresponding to four sides of the display panel 200 or may be disposed in a place corresponding to at least some of the four sides of the display panel 200. In one embodiment, the mold frame 300 may have a shape of a quadrilateral loop corresponding to the four sides of the display panel 200, or may have a "⊏" shape (e.g., a c-shape, such as a shape having three sides of a quadrilateral loop) corresponding to three sides selected from the edges of the display panel 200.

The backlight assembly 400 may include the optical sheet 410, the light guide plate 420, a reflective sheet 430, the bottom chassis 440, and a light source unit 450.

The light source unit 450 may include a light source 451 and a circuit board 452 on which the light source 451 is disposed. The light source unit 450 may be disposed at an edge portion of the light guide plate 420 or on a light incident surface thereof, but the present disclosure is not limited thereto. For example, the light source unit 450 may emit light to the edge portion or the light incident surface of the light guide plate 420.

The light source 451 may include at least one LED chip The light source 451 may further include a package configured to accommodate the LED chip. The light source 451 may have an emission surface towards or facing towards the light guide plate 420.

The circuit board 452 may include or be, for example, a printed circuit board (PCB) or a metal core PCB.

The light source unit 450 may be disposed on one side surface, two side surfaces, or all four side surfaces of the light guide plate 420, or may be disposed on at least one of the edge portions of the light guide plate 420 according to the characteristics, such as the size, luminance uniformity and/or the like of the display panel 200.

Light emitted from the light source 451 may be incident on the light incident surface of the light guide plate 420, and the light may be emitted or transmitted to a light emitting surface of the light guide plate 420. The light guide plate 420 may uniformly or substantially uniformly distribute the light received from the light source unit 450 to the display panel 200. The light guide plate 420 may be disposed in the vicinity of the light source unit 450 and may be accommodated in the bottom chassis 440. The light guide plate 420 may be provided in the form of, for example, a quadrangular plate like or similar to the display panel 200 (e.g., similar in shape and/or size), but embodiments of the inventive concept are not limited thereto. In the case where an LED is used as the light source 451, the light guide plate 420 may be formed in various suitable shapes including set or predetermined grooves, protrusions, or the like according to the location of the light source 451.

The light guide plate 420 is described as a plate for ease of description, but it may be provided in the form of a sheet or film to achieve slimness (e.g., to reduce thickness) of a display device. For example, the light guide plate 420 may include a plate and/or a film for guiding light.

The light guide plate 420 may be made of a light-transmissive material, e.g., an acrylic resin, such as polymethylmethacrylate (PMMA), or polycarbonate (PC), so as to guide light efficiently, but the present disclosure is not limited thereto.

A pattern may be defined on at least one surface of the light guide plate 420. For example, a lower surface thereof may be formed with a scattering pattern so that guided light may be emitted or transmitted upwards (e.g., towards the display panel 200).

The optical sheet 410 may be disposed on the light guide plate 420, and may serve to diffuse and collimate light transmitted from the light guide plate 420. The optical sheet 410 may include a diffusion sheet, a prism sheet, and a protective sheet. The diffusion sheet may diffuse light incident from the light guide plate 420 so as to reduce or effectively prevent the light from being partially concentrated. The prism sheet may have triangular prisms on one surface thereof in a set or predetermined arrangement, and the prism sheet may be disposed on the diffusion sheet so as to collimate light diffused from the diffusion sheet in a direction perpendicular or substantially perpendicular to the display panel 200. The protective sheet may be disposed on the prism sheet so as to protect a surface of the prism sheet and to diffuse light to obtain equally or substantially equally distributed light.

The reflective sheet 430 may be disposed between the light guide plate 420 and the bottom chassis 440, so that light emitted downwards from the light guide plate 420 may be reflected towards the display panel 200, thereby increasing light efficiency.

The reflective sheet 430 may include or be made of, for example, polyethylene terephthalate (PET), which imparts reflective properties, and one surface of the reflective sheet 430 may be coated with a diffusion layer containing, for example, titanium dioxide, but the present disclosure is not limited thereto.

In some embodiments, the reflective sheet 430 may include or be made of a material containing a metal such as silver (Ag).

The bottom chassis 440 may accommodate the reflective sheet 430 and the light guide plate 420. The bottom chassis 440 may include a base portion and a support wall bendably extending from the base portion. The base portion of the bottom chassis 440 may correspond to a bottom surface of the bottom chassis 440 and may be parallel or substantially parallel to the light guide plate 420. The support wall of the bottom chassis 440 may correspond to a side surface of the bottom chassis 440. The bottom chassis 440 may include or be made of a metal material having hardness such as stainless steel or a material having good heat dissipation properties such as aluminum or aluminum alloys, but the present disclosure is not limited thereto. In this embodiment, the bottom chassis 440 may be configured to maintain a shape of a display device and to protect a variety of components accommodated in the bottom chassis 440.

In the embodiment of the display device having the structure described above, a conductive tape 600 may be disposed on the top chassis 100 in order to reduce or remove the inflow of external static electricity and also reduce or effectively prevent damage to the driving chips 531 and 541, the driving chip-mounted films 530 and 540, and the PCBs 510 and 520. Thus, aspects of embodiments of the present disclosure are directed toward protecting a driving chip from static electricity entering through a top chassis.

The conductive tape 600 may be disposed between the bottom chassis 440 and the top chassis 100. The conductive tape 600 may be in contact (e.g., direct contact) with the bottom chassis 440 and the top chassis 100. The conductive tape 600 may be disposed on the driving chip-mounted films 530 and 540 and the PCBs 510 and 520.

The conductive tape 600 may have an uneven pattern. The uneven pattern may have a peak that is directed towards the display panel 200. In one embodiment, for instance, the conductive tape 600 may have an uneven pattern shaped like a triangle or a series of triangles, but the present disclosure is not limited thereto. As illustrated in FIG. 1, an embodiment of the conductive tape 600 may have an uneven pattern including or consisting of triangular concavo-convex portions that are continuously or substantially continuously repeated (e.g., the pattern may include a plurality of triangles arranged in a line). As an end of an object becomes more pointed and tapered, static electricity may occur more intensively at the end. Therefore, in some embodiments, the peak of the conductive tape 600 has a feature of defining a discharge path that discharges static electricity. Further, the peak may face towards the display panel 200, and thus external static electricity flowing into the display panel 200 may be induced to or directed toward the top chassis 100 and/or the bottom chassis 440.

The conductive tape 600 may include or be an adhesive tape including a conductive material. Examples of the conductive material may include aluminum and copper, but the present disclosure is not limited thereto.

In some embodiments, the top chassis 100 may include a sidewall 110 coupled to the bottom chassis 440 and a protrusion 120 bendably extending from the sidewall 110 (e.g., as shown in FIGS. 1 and 2). The bottom chassis 440 may include a base portion shaped like a plate and a support wall bendably extending from the base portion. In one embodiment, the sidewall 110 may be parallel or substantially parallel to the support wall of the bottom chassis 440 and the protrusion 120 may be parallel or substantially parallel to the base portion of the bottom chassis 440. The protrusion 120 may be disposed on an edge portion of the display panel 200.

In embodiments of the top chassis 100 and the bottom chassis 440 having the structures described above, the conductive tape 600 may be in contact (e.g., direct contact) with the protrusion 120 and the support wall of the bottom chassis 440. The conductive tape 600 may also be in contact (e.g., direct contact) with the sidewall 110 and the base portion of the bottom chassis 440.

Holes 130 may be defined in the protrusion 120 along the display panel 200 as illustrated in FIG. 1 (e.g., the holes 130 may be arranged along the display panel 200). The holes 130, as illustrated in FIG. 1, may be defined in or defined only in portions of the protrusion 120 of the top chassis 100 that overlap respective ones of the driving chip-mounted films 530 and 540 and the PCBs 510 and 520 to easily emit or discharge static electricity. The static electricity flows towards the driving chip-mounted films 530 and 540 and the PCBs 510 and 520, utilizing the holes 130. The protrusion 120 may have holes 130 in respective edges thereof in order to reduce or effectively remove static electricity that flows into a display device. For example, the top chassis 100 may have the holes 130 in all four edges thereof. Accordingly, the holes 130 may be defined to correspond to the respective conductive tapes 600 that are disposed on all of the four edges of the top chassis 100.

The holes 130 may serve as a discharge path for externally introduced static electricity. In one embodiment, the holes 130 may provide a discharge path that induces or discharges static electricity to the conductive tape 600. The holes 130 may have a polygonal shape, but the present disclosure is not limited thereto. The polygonal holes 130 may have vertices that enable concentration of the static electricity as previously described.

The conductive tape 600 may be disposed under the holes 130. For example, the conductive tape 600 may overlap part of the holes 130. Accordingly, the externally introduced static electricity may be induced or discharged to the conductive tape 600 via the holes 130.

As illustrated in FIG. 3, the externally introduced static electricity "e" may flow in the order of the hole 130, the conductive tape 600, and the support wall of the bottom chassis 440. For example, the hole 130, the conductive tape 600, and the bottom chassis 440 may serve as or provide a discharge path for the static electricity. The externally introduced static electricity may also flow into the top chassis 100.

The externally introduced static electricity may be reduced or effectively removed utilizing the conductive tape 600 having the peak as described above. The conductive tape 600 may protect the driving chips 531 and 541, the driving chip-mounted films 530 and 540, and/or the PCBs 510 and 520 from the static electricity by virtue of the discharge path.

Hereinafter, an arrangement of a conductive tape according to a second embodiment will be described with reference to FIGS. 4 to 5C.

Figure 4:
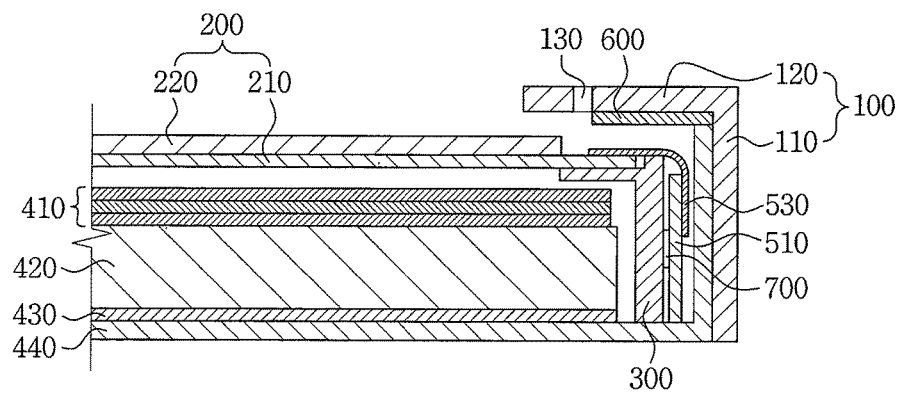
FIG. 4 is a cross-sectional view of a display device according to a second embodiment of the inventive concept.
Figure 5A:
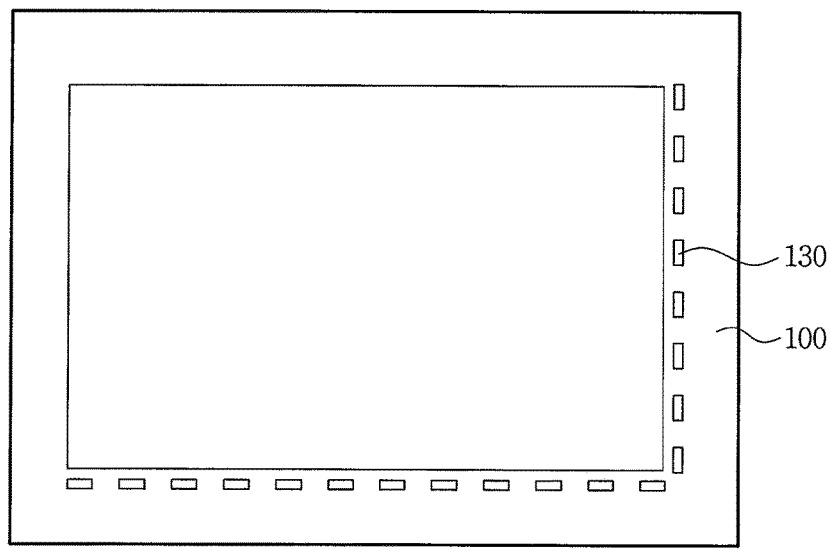
FIGS. 5A to 5C are plan views and a perspective view illustrating a top chassis and a conductive tape illustrated in FIG. 4.
Figure 5B:
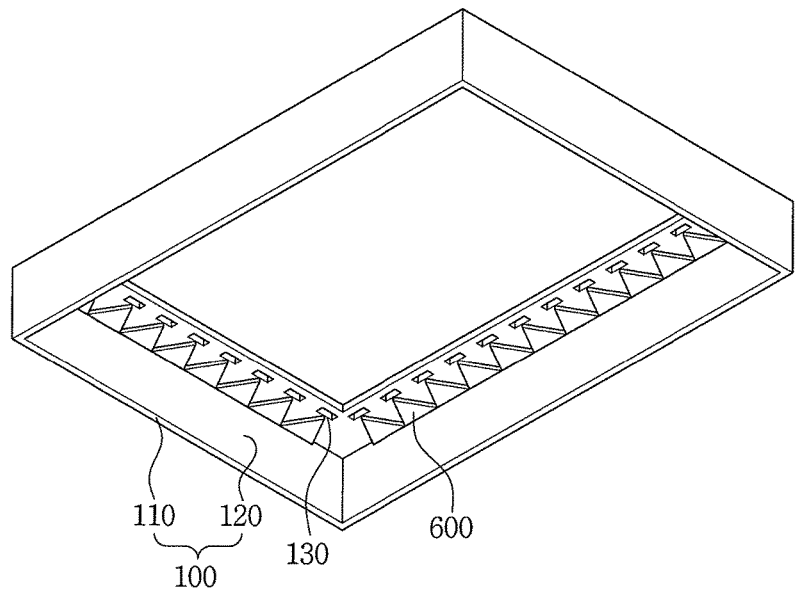

FIG. 4 is a cross-sectional view of a display device according to the second embodiment of the inventive concept. FIGS. 5A and 5C are plan views and FIG. 5B is a perspective view of the top chassis and the conductive tape illustrated in FIG. 4.

Figure 5C:
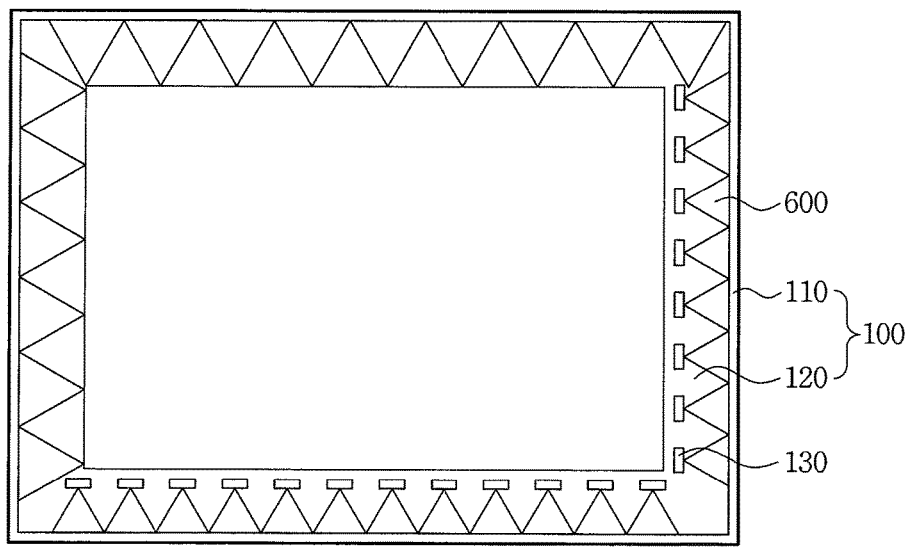

Referring to FIGS. 4 to 5C, the conductive tape 600 may be disposed on a lower surface of the protrusion 120 of the top chassis 100. The conductive tape 600 may have a peak that faces the hole 130. For example, the conductive tape 600 may not overlap the hole 130 unlike the embodiment illustrated in FIG. 2 and the peak of the conductive tape 600 may be arranged at a boundary of the hole 130. Therefore, static electricity at or around the boundary of the hole 130 may be immediately concentrated at or in the peak of the conductive tape 600. As can be seen in FIG. 5C, the conductive tape 600 may also include a peak arranged at a boundary of the protrusion 120.

Hereinafter, third through eighth embodiments of the present invention will be described with reference to FIGS. 6 to 11.

Figure 6:
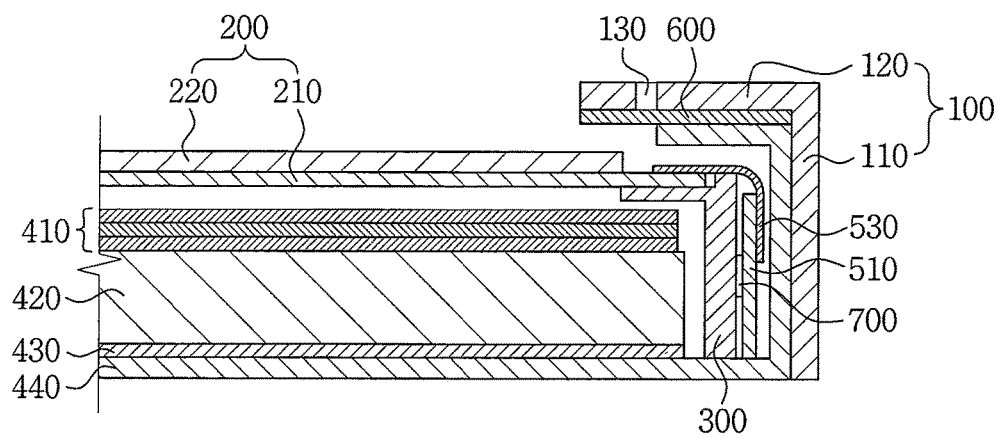
FIG. 6 is a cross-sectional view of a display device according to a third embodiment of the inventive concept.
Figure 7:
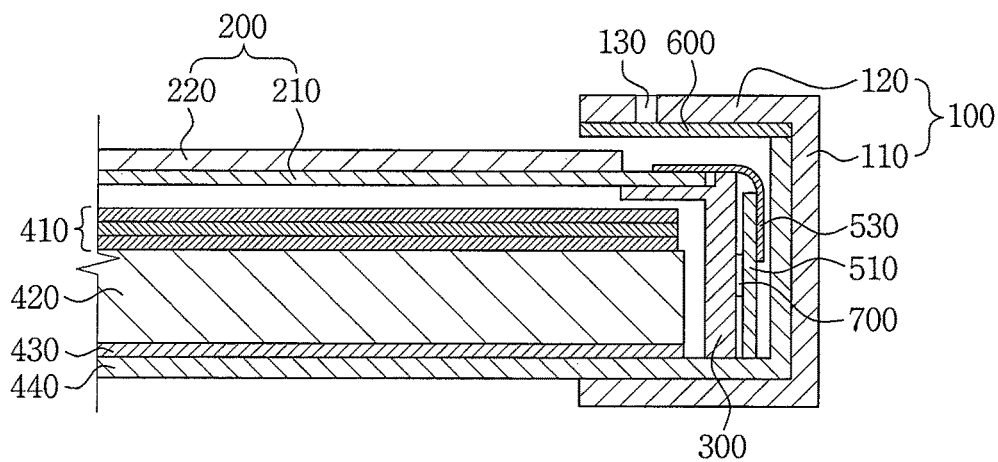
FIG. 7 is a cross-sectional view of a display device according to a fourth embodiment of the inventive concept.
Figure 8:
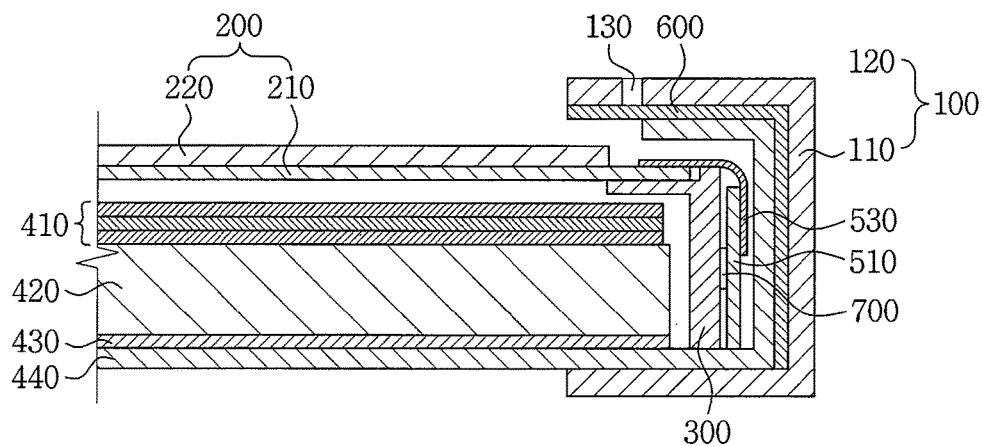
FIG. 8 is a cross-sectional view of a display device according to a fifth embodiment of the inventive concept.
Figure 9A:
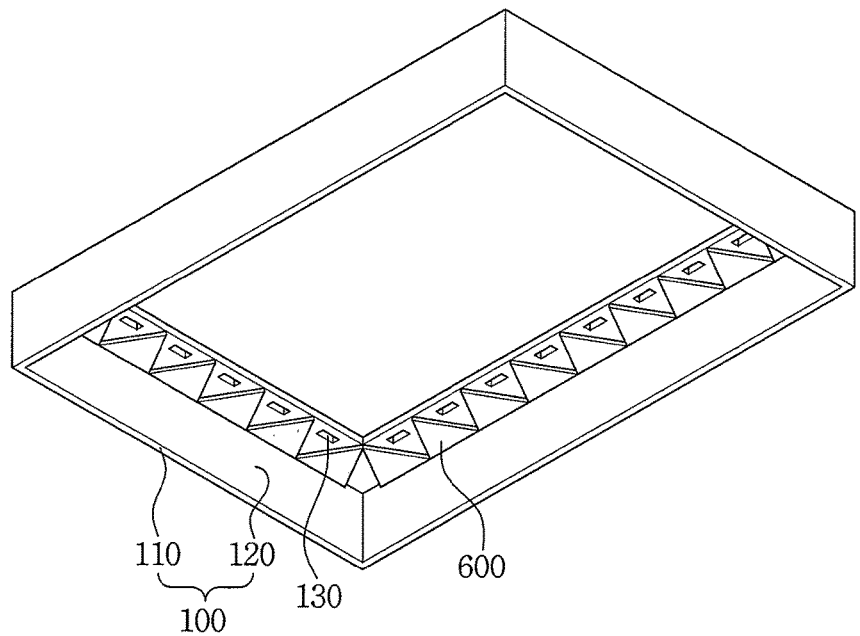
FIGS. 9A and 9B are a perspective view and a plan view illustrating a top chassis and a conductive tape according to a sixth embodiment of the inventive concept.
Figure 9B:
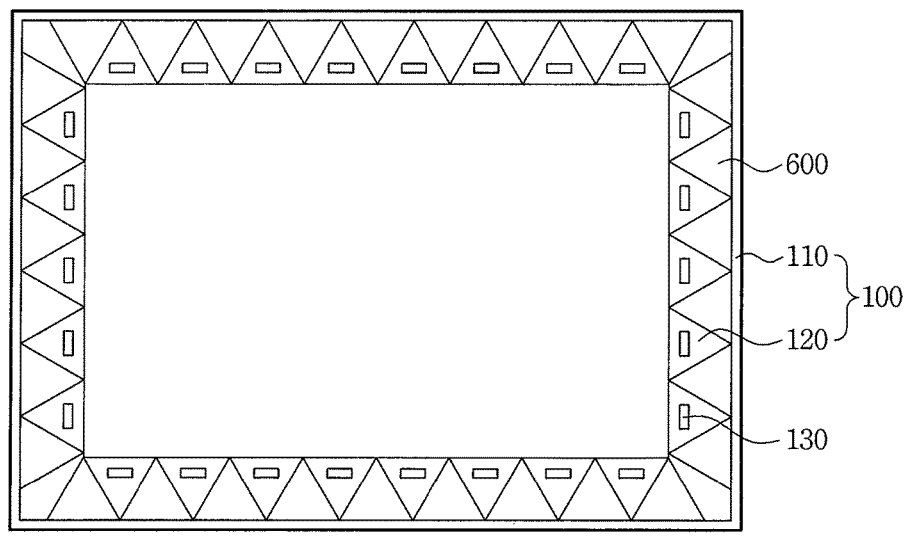
Figure 10A:
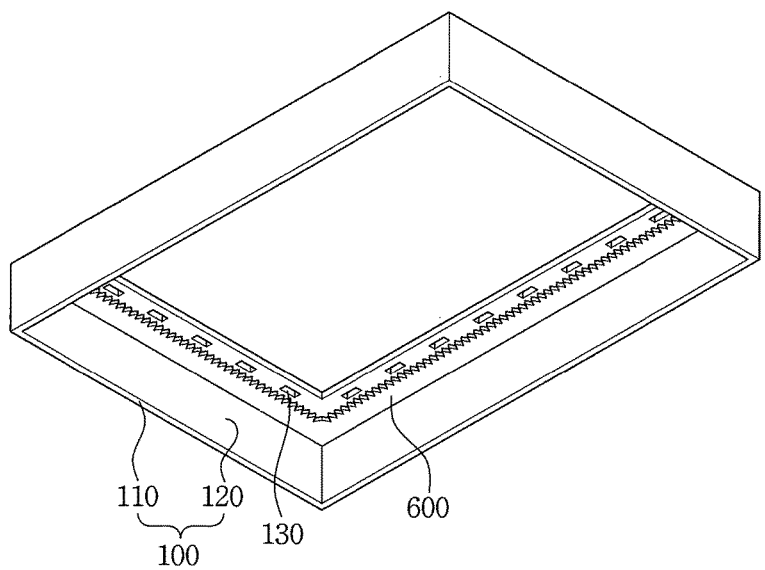
FIGS. 10A and 10B are a perspective view and a plan view illustrating a top chassis and a conductive tape according to a seventh embodiment of the inventive concept.
Figure 10B:
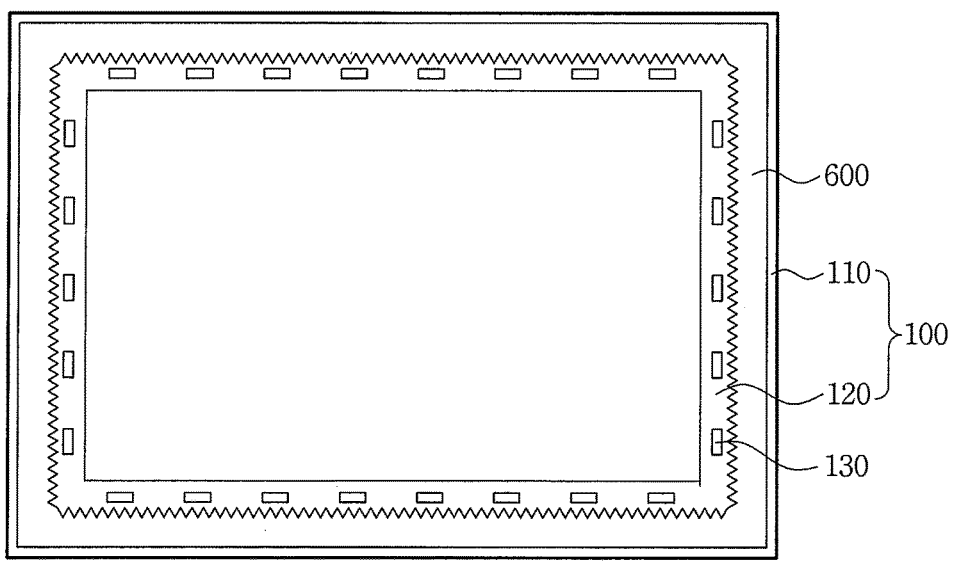
Figure 11:
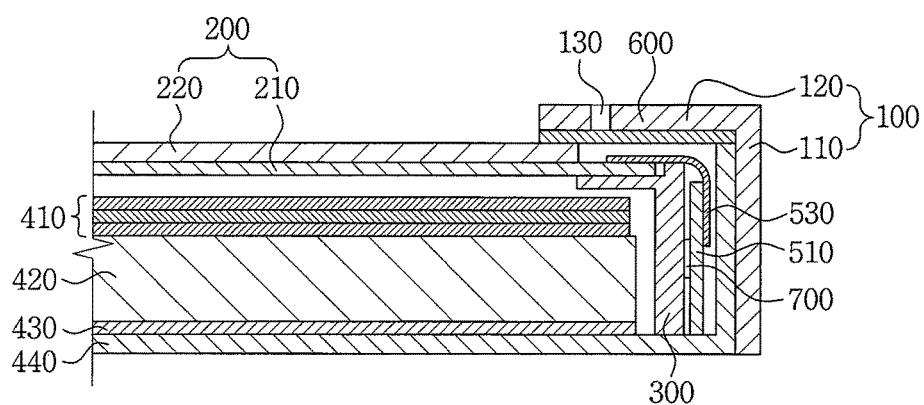
FIG. 11 is a cross-sectional view of a display device according to an eighth embodiment of the inventive concept.

FIG. 6 is a cross-sectional view of a display device according to the third embodiment of the present invention. FIG. 7 is a cross-sectional view of a display device according to the fourth embodiment of the present invention. FIG. 8 is a cross-sectional view of a display device according to the fifth embodiment of the present invention. FIGS. 9A and 9B are a perspective view and a plan view, respectively, of the top chassis and the conductive tape according to the sixth embodiment of the present invention. FIGS. 10A and 10B are a perspective view and a plan view, respectively, of a top chassis and a conductive tape according to the seventh embodiment of the present invention. FIG. 11 is a cross-sectional view of a display device according to the eighth embodiment of the present invention.

Referring to FIG. 6, the bottom chassis 440 according to the third embodiment further includes a mounting part that bendably extends from the support wall of the bottom chassis 440. For example, the conductive tape 600 may be disposed between the protrusion 120 and the mounting part. The conductive tape 600 may be stably supported by the mounting part.

Referring to FIG. 7, the top chassis 100 according to the fourth embodiment bendably extends from the sidewall 110 to further include a bottom part that faces the protrusion 120 (e.g., the bottom part of the top chassis 100 may be parallel or substantially parallel to the protrusion). The top chassis 100 may have a " ⊏ " shaped cross-section (e.g., a c-shaped cross-section) and may be stably coupled to a side surface of a display device.

Referring to FIG. 8, the conductive tape 600 according to the fifth embodiment may be disposed on a surface of the protrusion 120 and on a surface of the sidewall 110. For example, the conductive tape 600 may extend to or along the support wall of the bottom chassis 440 and to or along the sidewall 110 of the top chassis 100.

Further, the conductive tape 600 may extend to or along the bottom part of the top chassis 100 and may extend to or along the base portion of the bottom chassis 440. For example, the conductive tape 600 may be disposed on a surface of the bottom part of the top chassis 100. The conductive tape 600 may extend such that a discharge path of static electricity may be easily formed.

Referring to FIGS. 9A and 9B, the conductive tape 600 according to the sixth embodiment may have a peak or peaks between the holes 130 (e.g., between two of the holes). For example, respective ones of the peaks may be between adjacent ones of the holes. The peak of the conductive tape 600 may be located or positioned in different places, and the varying locations of the peak may allow the discharge path of static electricity to also vary.

Referring to FIGS. 10A and 10B, the conductive tape 600 according to the seventh embodiment may have an uneven pattern at or on an end portion thereof. For example, instead of having a triangular shape, the conductive tape 600 may be shaped like a line or band, which may be different from the above-described embodiments. The uneven pattern may be defined at or on an end portion of the line-shaped (or band-shaped) conductive tape 600. The conductive pattern 600 may have a peak that faces the hole 130. Therefore, static electricity flowing via the hole 130 may be easily induced or discharged to the conductive tape 600.

Referring to FIG. 11, the conductive tape 600 according to the eighth embodiment may be in contact (e.g., direct contact) with the display panel 200. Static electricity occurring at or in the display panel 200 may be dissipated outwards because the conductive tape 600 is in contact (e.g., direct contact) with the display panel 200.

From the foregoing, it will be appreciated that various embodiments of the inventive concept have been described herein for purposes of illustration, and that various modifications may be made without departing from the scope and spirit of the present disclosure. Accordingly, the various embodiments disclosed herein are not intended to limit the scope of the inventive concept, and the true scope and spirit of the inventive concept is indicated by the following claims, and equivalents thereof.

What is claimed is:

1. A display device comprising:
a display panel;
a light source configured to provide light to the display panel;
a bottom chassis in which the light source is located;
a top chassis coupled to the bottom chassis and covering an edge of the display panel; and
a conductive tape attached to the bottom chassis and the top chassis and spaced apart from the display panel,
wherein the top chassis comprises:
   a sidewall coupled to the bottom chassis; and
   a protrusion bendably extending from the sidewall, the protrusion being on an edge portion of the display panel,
wherein the bottom chassis comprises a support wall having a top portion facing the protrusion of the top chassis,
wherein the conductive tape is between the top portion of the support wall and the protrusion of the top chassis, and
wherein the conductive tape has an uneven pattern having a plurality of triangular shapes adjacent to each other on a plan view.

2. The display device of claim 1, wherein the protrusion has holes along the display panel.

3. The display device of claim 2, wherein each of the triangular shapes has a peak facing the holes.

4. The display device of claim 2, wherein each of the triangular shapes has a peak, and respective ones of the peaks are between adjacent ones of the holes.

5. The display device of claim 1, wherein the conductive tape is on one surface of the protrusion.

6. The display device of claim 1, wherein the conductive tape is, further on one surface of the sidewall.

7. The display device of claim 1, wherein the top chassis further comprises a bottom part that bendably extends from the sidewall and that faces the protrusion.

8. The display device of claim 7, wherein the conductive tape is further on one surface of the sidewall, and on one surface of the bottom part.

9. The display device of claim 1, further comprising:
a driving chip-mounted film coupled to the display panel and configured to provide the display panel with driving signals; and
a printed circuit board coupled to the driving chip-mounted film.

10. The display device of claim 9, wherein the printed circuit board is on a side surface of the bottom chassis and faces the sidewall of the top chassis.

11. The display device of claim 10, wherein the conductive tape is on the driving chip-mounted film.

12. The display device of claim 11, wherein the conductive tape is further on the printed circuit board.

13. The display device of claim 1, wherein the conductive tape physically contacts both the top chassis and the bottom chassis.

* * * * *